(12) United States Patent
Geen

(10) Patent No.: US 6,470,748 B1
(45) Date of Patent: Oct. 29, 2002

(54) FEEDBACK MECHANISM FOR RATE GYROSCOPES

(75) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/679,462

(22) Filed: Oct. 4, 2000

Related U.S. Application Data

(60) Provisional application No. 60/159,279, filed on Oct. 13, 1999.

(51) Int. Cl.[7] ................................................. G01P 9/04
(52) U.S. Cl. ................................................... 73/504.12
(58) Field of Search ......................... 73/504.12, 504.14, 73/504.15, 504.16

(56) References Cited

U.S. PATENT DOCUMENTS

| | | | |
|---|---|---|---|
| 2,927,962 A | 3/1960 | Cutler .......................... 178/43.5 |
| 3,192,371 A | 6/1965 | Brahm .......................... 235/183 |
| 3,560,957 A | 2/1971 | Miura et al. ................... 340/347 |
| 3,656,354 A | 4/1972 | Lynch ............................ 73/505 |
| 3,670,578 A | 6/1972 | Schulte ........................... 74/5.6 |
| 3,839,915 A | 10/1974 | Schlitt ............................ 73/505 |
| 3,924,475 A | 12/1975 | Stiles ........................... 74/5.6 A |
| 3,992,952 A | 11/1976 | Hutton et al. ................... 73/505 |
| 4,038,527 A | 7/1977 | Brodie et al. ................. 235/150.25 |
| 4,264,838 A | 4/1981 | Jacobson ....................... 310/329 |
| 4,926,178 A | 5/1990 | Mallinson ...................... 341/143 |
| 5,025,346 A | 6/1991 | Tang et al. ..................... 361/283 |
| 5,055,843 A | 10/1991 | Ferguson, Jr. et al. ........ 341/143 |
| 5,311,181 A | 5/1994 | Ferguson, Jr. et al. ........ 341/143 |
| 5,392,650 A | 2/1995 | O'Brien et al. ................ 73/517 |
| 5,496,436 A | 3/1996 | Bernstein et al. ............ 156/628.1 |
| 5,604,312 A | * 2/1997 | Lutz .......................... 73/504.12 |
| 5,900,549 A | * 5/1999 | Moriya ....................... 73/504.12 |
| 5,945,599 A | * 8/1999 | Fujiyoshi et al. ......... 73/504.12 |
| 5,952,574 A | 9/1999 | Weinberg et al. .......... 73/504.16 |
| 6,089,089 A | * 7/2000 | Hsu .......................... 73/504.12 |
| 6,122,961 A | 9/2000 | Geen et al. ............... 73/504.12 |

FOREIGN PATENT DOCUMENTS

GB 2127637 A 4/1984

* cited by examiner

*Primary Examiner*—John E. Chapman
(74) *Attorney, Agent, or Firm*—Weingarten, Schurgin, Gagnebin & Lebovici LLP

(57) ABSTRACT

A mechanical rate gyroscope including a micro-fabricated mechanical sensor. The mechanical sensor includes a first segmented drive system used to impart vibration to a mass and a transverse segmented drive system used to cancel a Coriolis force applied to the mass when the mechanical sensor undergoes rotation. The mechanical rate gyroscope further includes a force-feedback control mechanism used to provide at least one cycle of drive signals employed by the first drive system to the transverse drive system. The force-feedback control mechanism generates a feedback signal used to control the polarity of the drive signals provided to the transverse drive system. The feedback signal has a pulse repetition frequency proportional to the applied angular rate. The proportionality constant relating the applied angular rate to the pulse repetition frequency includes transduction coefficients that are less sensitive to the mechanical and electrical properties of the gyroscope.

13 Claims, 3 Drawing Sheets ically to mechanical rate gyroscopes, and more specifically to mechanical rate gyroscopes having transduction coefficients that are less sensitive to the mechanical and electrical properties of the gyroscopes.

FEEDBACK MECHANISM FOR RATE GYROSCOPES

CROSS REFERENCE TO RELATED APPLICATIONS

This application claims priority of U.S. Provisional Patent Application No. 60/159,279, filed Oct. 13, 1999 entitled FEEDBACK MECHANISM FOR RATE GYROSCOPES.

STATEMENT REGARDING FEDERALLY SPONSORED RESEARCH OR DEVELOPMENT

N/A

BACKGROUND OF THE INVENTION

The present invention relates generally to mechanical rate gyroscopes, and more specifically to mechanical rate gyroscopes having transduction coefficients that are less sensitive to the mechanical and electrical properties of the gyroscopes.

Mechanical rate gyroscopes are known that employ the Coriolis effect to provide a measure of an applied angular rate. In a conventional mechanical rate gyroscope, a body with a mass, m, is supported by a flexible suspension system from a rigid accelerometer frame. The body is caused to vibrate at a velocity, v, by a drive force, Fd, as the rigid frame rotates at an applied angular rate, $\Omega_{IN}$, about a rate-sensing axis perpendicular to the velocity of the body. The combined vibration and angular displacement causes the body to undergo Coriolis acceleration, $Ac=2v\Omega_{IN}$, in a direction perpendicular to both the velocity and the rate-sensing axis. Accordingly, a Coriolis force, Fc=mAc, is applied to the body, thereby causing the body to deflect in the direction of the Coriolis acceleration.

In the conventional mechanical rate gyroscope, such deflection of the body is typically restrained by either a mechanical or electrical restraint, e.g., a mechanical spring having a spring constant, k. The deflection of the body in the direction of the Coriolis acceleration may therefore be defined by the expression, y=Fc/k. Moreover, the deflection of the body is typically measured using a displacement sensor such as a device that measures a difference in capacitance caused by a change in the spacing between parallel plates of a capacitor. If one plate of the capacitor is operatively coupled to the body and the other plate is fixed to the rigid frame, then the change in the spacing between the plates is proportional to the deflection of the body. Such a displacement sensor produces an output that is proportional to the applied angular rate, $\Omega_{IN}$; and, the proportionality constant, K, is commonly known as the sensitivity of the rate gyroscope.

The sensitivity, K, of the conventional mechanical rate gyroscope typically includes a plurality of transduction coefficients, which are functions of the mechanical dimensions, material properties, and electronic gains of the gyroscope and its supporting circuitry, and the voltages, currents, and fields applied thereto. The output of the conventional mechanical rate gyroscope is therefore subject to the various uncertainties and instabilities of these transduction coefficients. Such uncertainties and instabilities are typically minimized by measuring and trimming the transduction coefficients during the manufacturing process, and/or by providing specialized signal conditioning circuitry at the gyroscope output. However, such added manufacturing steps and signal conditioning circuitry can significantly increase the size and cost of mechanical rate gyroscopes, particularly, micro-fabricated mechanical rate gyroscopes.

It would therefore be desirable to have an improved mechanical rate gyroscope with transduction coefficients that are less sensitive to the mechanical and electrical properties of the gyroscope. Such an improved mechanical rate gyroscope would have a reduced size and would be fabricated using a simplified manufacturing process, thereby reducing the overall cost of the gyroscope. It would also be desirable to have such an improved mechanical rate gyroscope that can be fabricated using conventional silicon micro-machining techniques.

BRIEF SUMMARY OF THE INVENTION

In accordance with the present invention, a mechanical rate gyroscope is provided which has transduction coefficients that are less sensitive to the mechanical and electrical properties of the gyroscope. The mechanical rate gyroscope includes a first segmented drive system used to impart vibration to a mass, and a transverse segmented drive system formed from similar segments and used to generate a feedback force to cancel a Coriolis force applied to the mass when the gyroscope undergoes angular displacement. The mechanical rate gyroscope further includes a force-feedback control mechanism used to provide at least one complete cycle of the drive signal employed by the first drive system to the transverse drive system. The force-feedback control mechanism generates a feedback signal used to control the polarity of the complete cycles of the drive signal provided to the transverse drive system. The feedback signal comprises a pulse repetition frequency proportional to the applied angular rate. The proportionality constant relating the applied angular rate to the pulse repetition frequency includes transduction coefficients that are less sensitive to the mechanical and electrical properties of the gyroscope.

Other features, functions, and aspects of the mechanical rate gyroscope will be evident from the Detailed Description of the Invention that follows.

BRIEF DESCRIPTION OF THE SEVERAL VIEWS OF THE DRAWING

The invention will be more fully understood with reference to the following detailed description of the invention in conjunction with the drawings of which.

DETAILED DESCRIPTION OF THE INVENTION

U.S. Provisional Patent Application No. 60/159,279 filed Oct. 13, 1999 is incorporated herein by reference.

Figure 1:
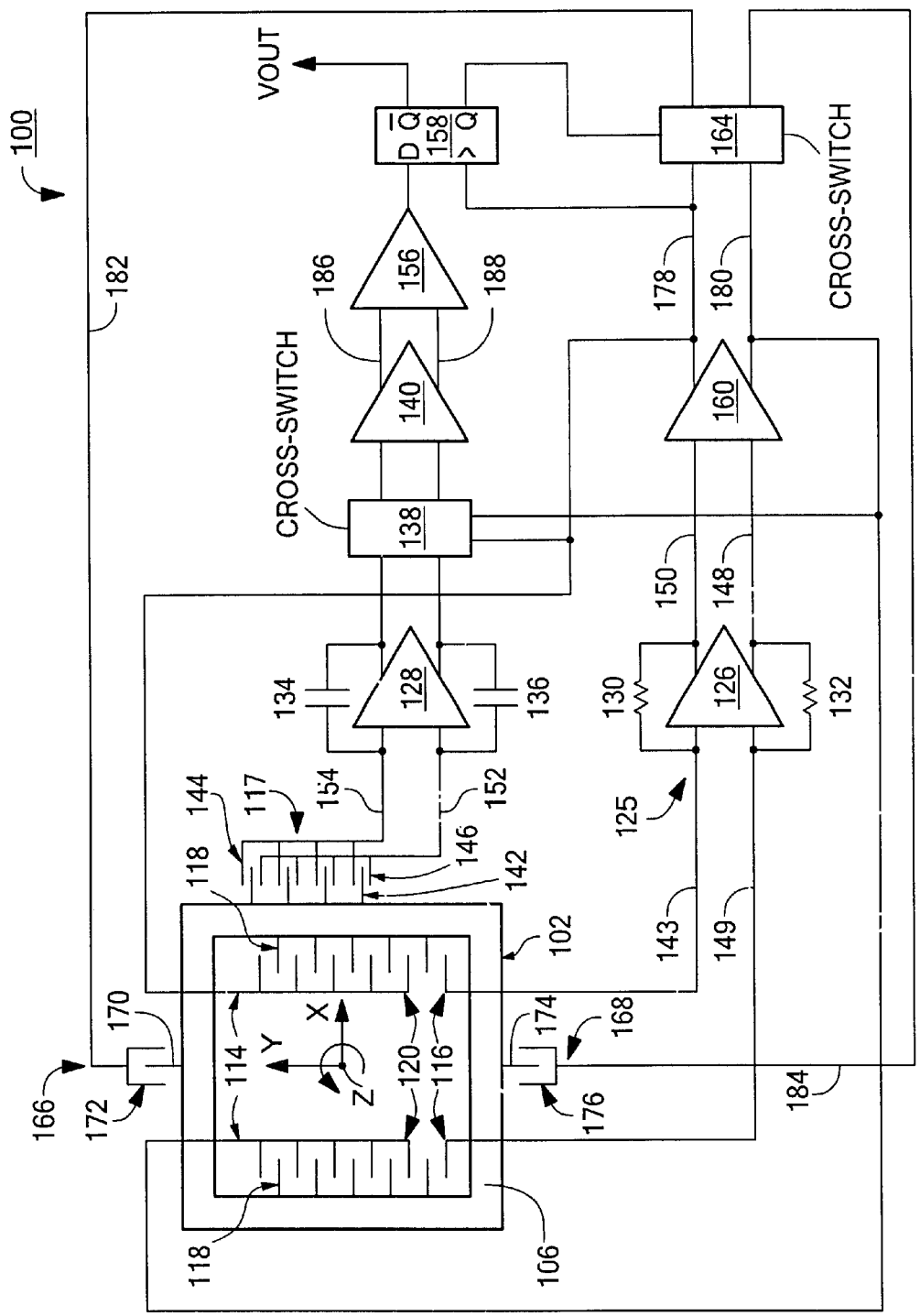
FIG. 1 is a schematic diagram of the mechanical rate gyroscope in accordance with the present invention.

FIG. 1 is a schematic diagram of an illustrative embodiment of a mechanical rate gyroscope 100 according to the present invention. As depicted in FIG. 1, the mechanical rate gyroscope 100 includes a mechanical sensor 102, which in a preferred embodiment comprises a silicon micro-machined sensor structure as described in the above-referenced U.S. Provisional Patent Application No. 60/159,279. Specifically, the mechanical sensor 102 includes a body 106, which is suspended from a rigid accelerometer frame by a plurality of flexures. The rigid frame is anchored to a silicon substrate at a plurality of anchor points by way of a plurality of transverse flexures. The rigid frame, the pluralities of flexures, and the anchors for anchoring the mechanical sensor assembly to the substrate are further described in the above-referenced U.S. Provisional Patent Application No. 60/159,279.

The body 106 is caused to vibrate along a drive axis, x, by segmented drive systems 114, which may be implemented as electro-static or electromagnetic segmented drive systems. In the illustrated embodiment, each of the drive systems 114 is an electro-static segmented drive system that includes a first set of drive segments 118 (i.e., electrodes or "fingers") integrally coupled to the body 106, and a second set of drive segments 120 (i.e., electrodes or "fingers") anchored to the substrate and interdigitated with the first set of drive segments 118. The body 106 vibrates at a velocity, v, along the drive axis, x, in response to an electro-static drive force, Fd, applied between the first and second sets of drive fingers 118 and 120. The electro-static drive force, Fd, is generated using drive signals comprising alternating voltages, which are provided to the drive systems 114 on respective lines 178 and 180. In an alternative embodiment, an electromagnetic drive force may be generated by applying alternating currents to suitable electromagnetic drive systems in the presence of a magnetic field.

Differential capacitance displacement sensors 116 sense the vibration of the body 106 and provide signals on respective lines 143 and 149 that are used to sustain the oscillation of the vibrating body 106. In this exemplary embodiment, the displacement sensors 116 include at least one sense finger integrally coupled to the body 106 and at least one corresponding sense finger anchored to the substrate. A suitable electro-static drive system for providing sustained oscillation of a vibrating body is described in U.S. Pat. No. 5,025,346 issued Jun. 18, 1991 to Tang et al. entitled Laterally Driven Resonant Microstructures, which is incorporated herein by reference.

Those of ordinary skill in the art will appreciate that if the body 106 vibrates along the drive axis, x, while the rigid frame rotates about a rate-sensing axis, z, orthogonal to the drive x-axis, then the body 106 undergoes Coriolis acceleration, Ac, along a sensitive axis, y, which is orthogonal to both the drive and rate-sensing axes. As a result, an apparent Coriolis force, Fc, is applied to the vibrating body 106 as the rigid frame undergoes angular displacement, thereby causing the vibrating body 106 to deflect along the sensitive axis, y.

In this exemplary embodiment, the rigid frame of the mechanical sensor 102 is prevented from moving in the direction of the drive axis, x, by at least a portion of the transverse flexures suspending the rigid frame from the substrate. Further, the deflection of the body 106 in the direction of the sensitive axis, y, is constrained by at least one of the transverse flexures, which may be a mechanical spring. In a preferred embodiment, the vibrating body 106 is constrained to move only in the direction of the drive axis, x, relative to the rigid frame; and, the rigid frame is constrained to move only in the direction of the sensitive axis, y, relative to the substrate.

The deflection of the vibrating body 106 along the sensitive axis, y, is measured by a differential capacitance displacement sensor 117, which includes a first set of sense fingers 142 integrally coupled to the rigid frame and corresponding second and third sets 144 and 146 of sense fingers fixed to the substrate. It is noted that the rigid frame and the first set of sense fingers 142 is carried with the vibrating body 106 as it deflects in the direction of the sensitive axis, y, relative to the substrate and the second and third sets 144 and 146 of fixed sense fingers. The displacement sensor 117 senses the deflection of the body 106 along the sensitive axis, y, and produces sense signals on respective lines 152 and 154 having magnitudes proportional to the magnitude of the deflection.

As described above, the displacement sensors 116 generate the signals on the lines 143 and 149 that are used by the mechanical rate gyroscope 100 to sustain the oscillation of the vibrating body 106. To that end, the mechanical rate gyroscope 100 has a transresistance amplifier 125 including a differential amplifier 126 and shunt feedback resistors 130 and 132. Specifically, the displacement sensors 116 provide the signals on the lines 143 and 149 to respective inputs of the transresistance amplifier 125, which generates signals of opposite polarity therefrom and feeds a comparator 160, which provides the drive signals to the drive systems 114 on the respective lines 178 and 180.

In a preferred embodiment, the drive signals are provided to the drive systems 114 to cause the body 106 to vibrate at mechanical resonance. The mechanical sensor 102, the transresistance amplifier 125, and the comparator 160 therefore form an oscillator circuit, in which the resonating body 106 is the frequency-determining element and the transresistance amplifier 125 provides the phase advance (i.e., 90° phase shift) required to sustain oscillation of the body 106 at mechanical resonance.

As also described above, the displacement sensor 117 generates the sense signals on the lines 152 and 154 having magnitudes proportional to the magnitude of the deflection of the body 106 along the sensitive axis, y. The sense signals are amplified by an amplifier 127, which includes a differential amplifier 128 and shunt feedback capacitors 134 and 136. The amplifier 127 amplifies the sense signals on the respective lines 152 and 154 while preserving their phase, and provides the amplified sense signals to a cross-switch 138, which in the illustrated embodiment functions as a synchronous demodulator.

Specifically, the cross-switch 138 receives the amplified sense signals as input signals and the signals on lines 178 and 180 as reference signals, and provides synchronously demodulated signals to a low-pass filter 140, which averages the demodulated signals. In a preferred embodiment, the filter 140 is implemented as an integrating filter. The filter 140 removes offsets and ripple from the demodulated signals, and provides the demodulated/averaged signals to a comparator 156 on respective lines 186 and 188.

Those of ordinary skill in the art will appreciate that the sensitivity of a mechanical rate gyroscope comprises a plurality of transduction coefficients, which are functions of, e.g., the mechanical dimensions, material properties, and electronic gains of the gyroscope, and/or the voltages, currents, and fields applied to various components of the gyroscope. In this illustrative embodiment of the mechanical rate gyroscope 100, the transduction coefficients are made less sensitive to the mechanical and electrical properties of the gyroscope by way of a force-feedback control mechanism including the comparator 156, a D-type flip-flop 158, a cross-switch 164, and transverse drive systems 166 and 168.

Specifically, the comparator 156 receives the demodulated/averaged signals as input signals, and provides a digital signal to the D-input of the D-type flip-flop 158. The digital signal is representative of the time average of the difference between the apparent Coriolis force, Fc, and a feedback force, Ff, generated by the transverse drive systems 166 and 168 and applied to the vibrating body 106 along the sensitive axis, y. Consequently, the latched output of the D-type flip-flop 158 comprises a plurality of pulses of alternate polarity (i.e., positive and negative) having a pulse repetition frequency (PRF) that is proportional to an angular rate, $\Omega_{IN}$, applied to the mechanical sensor 102. It is noted that the mechanical rate gyroscope 100 including the above-mentioned force-feedback control mechanism functions as a delta-sigma modulator.

The comparator 160 receives the signals generated by the transresistance amplifier 125 at its differential inputs, and provides digital outputs comprising the fundamental frequency component of these signals to the cross-switch 164 on the lines 178 and 180. The comparator 160 also provides the fundamental frequency component of the signal on the line 178 to the clock input of the D-type flip-flop 158.

As a result, the D-type flip-flop 158 latches the digital signal at its D-input each cycle of the drive signal and provides the latched signal at its Q-output to the cross-switch 164. The D-type flip-flop 158 also provides an inverted form of the latched signal, $V_{OUT}$, at its not-Q output. The cross-switch 164 uses the latched signal to control the provision of the drive signals on the lines 178 and 180 to the transverse drive systems 166 and 168. Specifically, the cross-switch 164 controls the polarities of complete cycles of the drive signals provided to the transverse drive systems 166 and 168 on respective lines 182 and 184. The transverse drive systems 166 and 168 use the drive signals to generate the feedback force, Ff, to cancel the effects of the Coriolis force, Fc, applied to the vibrating body 106 as the mechanical sensor 102 undergoes angular displacement.

It is noted that the digital signal generated by the comparator 156 is a form of error signal having bounds but no functional restriction on its values. Further, the output of the D-type flip-flop 158 is a feedback signal with a functional mapping between its mean value and the angular rate over the long-term, and an approximate mapping between its mean value and the angular rate in the short-term. The above-mentioned error signal is a measure of this approximation.

Like the drive systems 114, the transverse drive systems 166 and 168 are segmented drive systems that may be implemented as electrostatic or electromagnetic segmented drive systems. In the illustrated embodiment, the transverse drive system 166 is an electrostatic segmented drive system that includes at least one drive segment 170 (i.e., electrode or finger) integrally coupled to the body 106 and a plurality of drive segments 172 (i.e., electrodes or fingers) anchored to the substrate and interdigitated with the drive segment 170. Similarly, the transverse drive system 168 is an electrostatic segmented drive system that includes at least one drive finger 174 integrally coupled to the body 106 and a plurality of drive fingers 176 anchored to the substrate and interdigitated with the drive finger 174. It should be noted that in some embodiments of the mechanical rate gyroscope 100, it may be necessary to add inactive fingers adjacent the active fingers 170 and 174 of the transverse drive systems 166 and 168, respectively, to match fringe fields associated with the drive systems 114. Such fringe field matching in a mechanical rate gyroscope is described in the above-referenced U.S. Provisional Patent Application No. 60/159,279.

The operation of the mechanical rate gyroscope 100 will be better understood with reference to the following analysis. As described above, the body 106 of the mechanical sensor 102 vibrates at the velocity, v, in response to the drive force, Fd, applied along the drive axis, x, by the drive systems 114. Specifically, the drive force, Fd, corresponds to the velocity, v, according to the expression, $$Fd = mv\omega_C, \qquad (1)$$

in which "m" is the mass of the body 106, and "$\omega_C$" is the characteristic frequency response of the system comprising the body 106. In general, the characteristic frequency response, $\omega_c$, of a second-order system may be expressed as $$\omega_C = [\omega_O^2 + j\omega(\omega_O/Q) - \omega^2]/\omega, \qquad (2)$$

in which "$\omega O$" is the natural resonant frequency of the second-order system, and "Q" is the quality factor of the frequency response at the natural resonant frequency, $\omega_O$. Further, the quality factor, Q, may be expressed as $$Q = \omega_O/BW, \qquad (3)$$

in which "BW" is the 3-dB bandwidth centered at the natural resonant frequency, $\omega_O$.

It is noted that a corresponding velocity response, $\omega$, for a second-order mechanical system comprising the body 106 may be expressed as $$\omega = \omega(Fd/m)/[k_D/m + j\omega(D/m) - \omega^2], \qquad (4)$$

in which "$k_D$" is the spring constant of the mechanical spring restraining the deflection of the body 106 along the sensitive axis, y; and, "D" is the damping caused by shear viscosity between the body 106 and the substrate. By equating like coefficients in (2) and (4) above, the natural resonant frequency, $\omega_O$, and quality factor, Q, may be expressed in terms of mechanical properties of the mechanical sensor 102, i.e., $$\omega_O^2 = k_D/m, \qquad (5)$$

and $$\omega_O/Q = D/m. \qquad (6)$$

As also described above, the vibration of the body 106 along the drive axis, x, combined with the rotation of the mechanical sensor 102 about the rate-sensing axis, z, causes the body 106 to undergo Coriolis acceleration, Ac, due to the apparent Coriolis force, Fc, applied along the sensitive axis, y. Specifically, the Coriolis force, Fc, corresponds to the Coriolis acceleration, Ac, according to the expression, $$Fc = mAc. \qquad (7)$$

Because Ac=2v$\Omega$, the Coriolis force, Fc, corresponds to the velocity, v, according to the expression, $$Fc = 2mv\Omega_{IN}, \qquad (8)$$

in which "$\Omega_{IN}$" is the angular rate applied to the mechanical sensor 102 to rotate it about the rate-sensing axis, z.

Accordingly, using (1) and (8) as defined above, the ratio of the Coriolis force, Fc, to the drive force, Fd, may be expressed as $$Fc/Fd = 2\Omega_{IN}/\omega_C. \qquad (9)$$

The drive force, Fd, is applied between the first and second sets of drive fingers 118 and 120; and, the feedback force, Ff, is applied between the transverse drive fingers 170 and 172 and the transverse drive fingers 174 and 176.

Accordingly, the ratio of the drive force, Fd, to the feedback force, Ff, is proportional to a number, N, i.e., $$Fd/Ff \alpha N, \tag{10}$$

in which "N" is defined by the ratio of the number of fingers (generally, segments) in the drive systems 114 and the transverse drive systems 166 and 168. In a preferred embodiment, a plurality of drive fingers 118 for each drive system 114 is integrally coupled to the body 106; and, a single drive finger 170 and a single drive finger 174 are similarly integrally coupled to the body 106. For example, the number, N, may be equal to 400; and, the feedback force, Ff, may be equivalent to an angular rate, $\Omega_{IN}$, of 70°/sec.

It follows that the feedback force, Ff, is proportional to the drive force, Fd, divided by the number, N, i.e., $$Ff \alpha Fd/N. \tag{11}$$

Using (11) as defined above, the feedback force, Ff, may therefore be expressed as $$Ff=R(Fd/N), \tag{12}$$

in which "R" is a number proportional to the amount of time during which the transverse drive systems 166 and 168 receive the drive signals to generate the required feedback force, Ff.

It is noted that the magnitude of the feedback force, Ff, is equal to that of the Coriolis force, Fc. Accordingly, using (12) as defined above, the ratio of the Coriolis force, Fc, to the drive force, Fd, may also be expressed as $$Fc/Fd=R/N. \tag{13}$$

Using (9) and (13) as defined above, the angular rate, $\Omega_{IN}$, applied to the mechanical sensor 102 to rotate it about the rate-sensing axis, z, may therefore be expressed as $$\Omega_{IN}=(R/2N)\omega_C. \tag{14}$$

As described above, the drive signals are preferably provided to the drive systems 114 on the lines 178 and 180 to operate the mechanical sensor 102 at mechanical resonance. The characteristic frequency, $\omega_C$, therefore corresponds to the 3-dB bandwidth, BW, centered at the natural resonant frequency, $\omega_O$, i.e., $$\omega_C=BW. \tag{15}$$

Using (3) and (15) as defined above, the characteristic frequency, $\omega_C$, may be expressed as $$\omega_C=\omega_O/Q. \tag{16}$$

Accordingly, using (14) and (16) as defined above, the angular rate, $\Omega_{IN}$, applied to the mechanical sensor 102 when the mechanical sensor 102 operates at mechanical resonance may be expressed as $$\Omega_{IN}=R(\omega_O/2)(1/NQ). \tag{17}$$

In this analysis, the PRF of the digital feedback signal generated by the comparator 156 is represented by an angular frequency, $\omega_S$, for clarity of discussion. Further, as mentioned above, the mechanical rate gyroscope 100 of this exemplary embodiment functions as a delta-sigma modulator. The feedback stream of a delta-sigma modulator with 1-bit A-to-D conversion (e.g., a comparator) includes only positive and negative quanta. In the absence of any input signal, these positive and negative quanta alternate to give a zero (0) mean. The only way in which the feedback stream can be changed is by replacing quanta with those of opposite polarity. Thus, the value of the stream can only change in two (2) quantum increments. In this case, the quanta consist of whole cycles of $\omega_O$ or their antiphase counterparts so that the zero feedback waveform looks like $$\omega_O/2, \tag{18}$$

with no $\omega_O$ component. It follows that if quanta are so changed at a PRF equivalent to $\omega_S$, then the time average of the feedback may be expressed as $$R=2\omega_S/\omega_O. \tag{19}$$

Accordingly, using (17) and (19) as defined above, the angular frequency, $\omega_S$, may be expressed as $$\omega_S=K_1\Omega_{IN}, \tag{20}$$

in which $$K_1=NQ. \tag{21}$$

The angular frequency, $\omega_S$, is therefore proportional to the applied angular rate, $\Omega_{IN}$. Moreover, the proportionality constant, $K_1$, comprises the transduction coefficients N and Q, which do not include any uncertainties from the amplification circuitry or electrical-to-mechanical interfaces of the mechanical rate gyroscope 100.

In the illustrated embodiment, the drive signals may also be provided to the drive systems 114 to operate the mechanical sensor 102 away from the natural resonant frequency, $\omega_O$. For example, the mechanical sensor 102 may be operated at angular frequencies, $\omega$, above the natural resonant frequency, $\omega_O$. In this case, the characteristic frequency response, $\omega_C$, may be expressed as $$\omega_C=\omega, \omega>\omega_O. \tag{22}$$

Accordingly, using (14) and (22) as defined above, the angular rate, $\Omega_{IN}$, applied to the mechanical sensor 102 when the mechanical sensor 102 operates above the natural resonant frequency, $\omega_O$, may be expressed as $$\Omega_{IN}=R(\omega/2)(1/N), \omega>\omega_O. \tag{23}$$

Further, because the angular frequency of the drive signal provided to the clock input of the D-type flip-flop 158 is equal to the applied angular frequency, $\omega$ ($\omega>\omega_O$), the angular frequency, $\omega_S$, may be expressed as $$\omega_S=R(\omega/2), \omega>\omega_O. \tag{24}$$

Using (23) and (24) as defined above, the angular frequency, $\omega_S$, may be expressed as $$\omega S=K_2\Omega_{IN}, \omega>\omega_O, \tag{25}$$

in which $$K_2=N. \tag{28}$$

The angular frequency, $\omega_S$, is therefore proportional to the applied angular rate, $\Omega_{IN}$. However, in this case, the proportionality constant, $K_2$, comprises only the transduction coefficient, N, which does not include any uncertainties from the amplification circuitry, the electrical-to-mechanical interfaces, or the mechanical properties of the mechanical rate gyroscope 100.

Because the mechanical rate gyroscope 100 has transduction coefficients that are less sensitive to, and in some cases completely unaffected by, the mechanical and electrical properties of the gyroscope, steps of measuring and trimming the transduction coefficients to reduce uncertainties and instabilities therein can be either simplified or eliminated, thereby simplifying the overall process of manufacturing the mechanical rate gyroscope 100. Moreover, specialized signal conditioning circuitry for reducing these uncertainties and instabilities can also be either simplified or eliminated, thereby reducing the size of the mechanical rate gyroscope 100.

Figure 2:
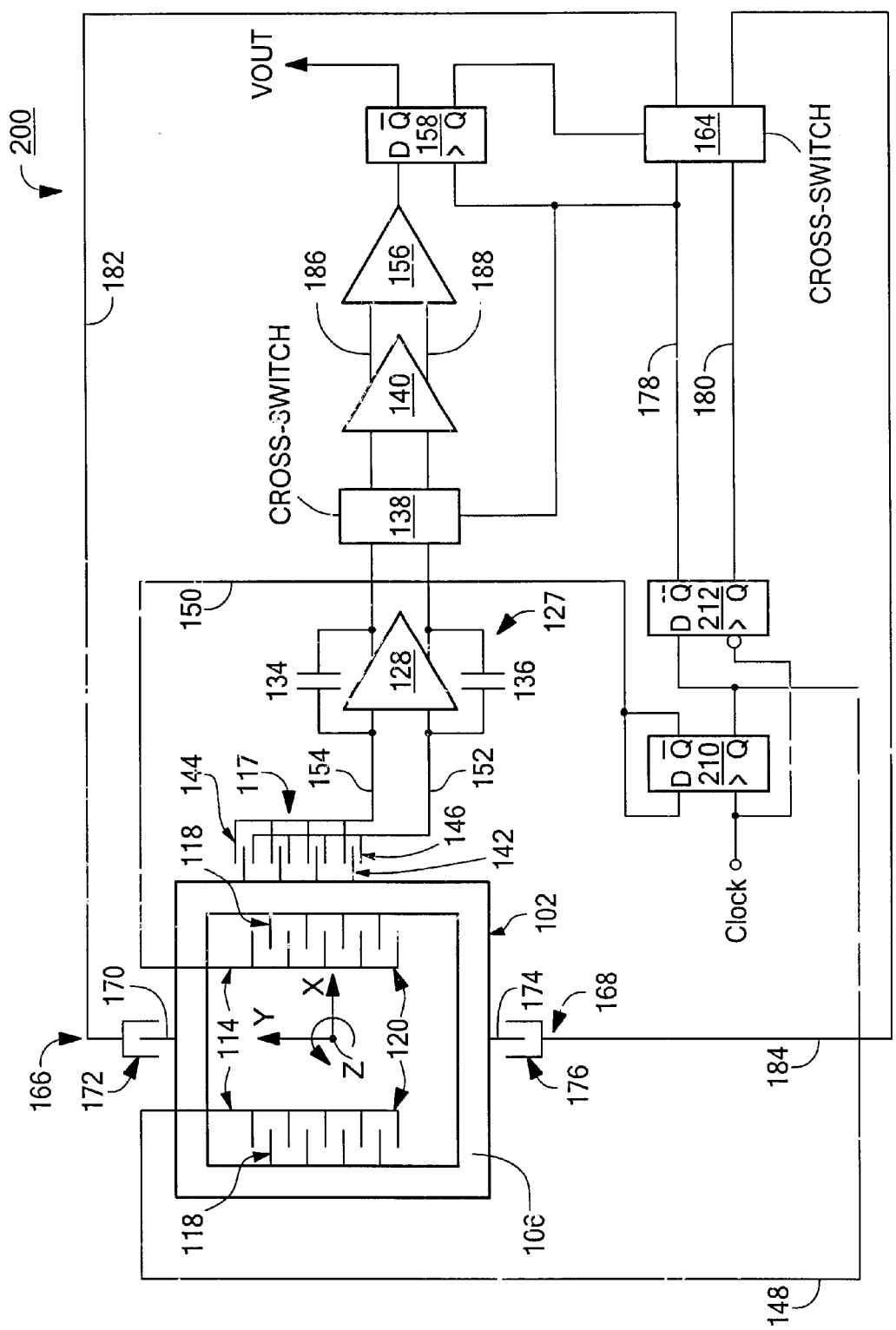
FIG. 2 is schematic diagram of a first alternative embodiment of the mechanical rate gyroscope of FIG. 1.

Having described the above illustrative embodiment of the mechanical rate gyroscope 100, other alternative embodiments or variations may be made. For example, FIG. 2 depicts a mechanical rate gyroscope 200 having a reduced size relative to the mechanical rate gyroscope 100. Such reduced size is achieved by replacing the transresistance amplifier 125 with D-type flip-flops 210 and 212. The D-type flip-flop 210 receives an externally generated clock at its clock input. Further, the D-type flip-flop 212 provides the drive signals of opposite polarity to the cross-switch 164; and, the drive signal provided on the line 178 is used to control the cross-switch 138 and clock the D-type flip-flop 158. Both D-type flip-flops 210 and 212 are needed above resonance in this alternative embodiment to produce the required 90° phase shift between the drive and feedback signals.

Figure 3:
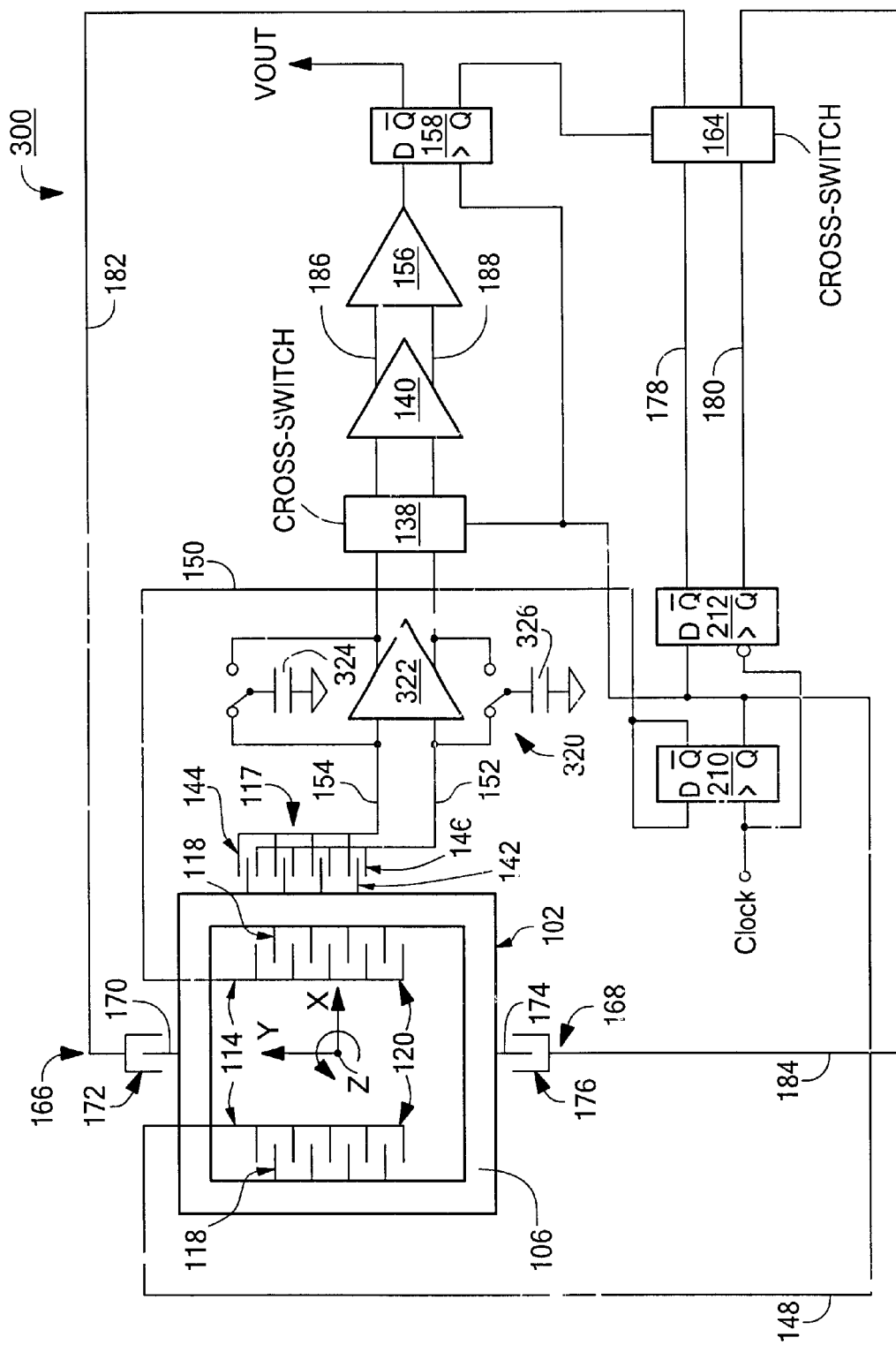
FIG. 3 is schematic diagram of a second alternative embodiment of the mechanical rate gyroscope of FIG. 1.

FIG. 3 depicts another mechanical rate gyroscope 300 with reduced size. In this alternative embodiment, the amplifier 127 is replaced by a switched-capacitor amplifier 320, which functions as a transresistance amplifier. Because the switched-capacitor amplifier 320 provides 90° phase shift, the control and clock inputs of the cross-switch switch 138 and the D-type flip-flop 158 are now provided by the D-type flip-flop 210 at its Q-output. It should be understood that the amplifier 127 may also be replaced by other amplifier configurations that provide such 90° phase advance.

Those of ordinary skill in the art will further appreciate that variations to and modification of the above-described mechanical rate gyroscope may be made without departing from the inventive concepts disclosed herein. Accordingly, the present invention should be viewed as limited solely by the scope and spirit of the appended claims.

What is claimed is:

1. A mechanical rate gyroscope, comprising:

a mechanical sensor including a base, a mass, a first segmented drive system configured to generate a drive force Fd to cause the mass to vibrate relative to the base, a displacement sensor configured to measure deflection of the mass caused by a Coriolis force generated in response to an applied angular rate, and a transverse segmented drive system configured to generate a feedback force Ff to cancel the Coriolis force; and control circuitry configured to receive the measure of deflection and provide at least one feedback signal based on the measure of deflection to the transverse drive system for generating the feedback force, wherein the first drive system includes a first number Nd of segments operatively coupled to the mass and the transverse drive system includes a second number Nf of segments operatively coupled to the mass, the segments of the transverse drive system being substantially similar to and transversely oriented relative to the segments of the first drive system, the segments of the first drive system and the segments of the transverse drive system being arranged to cause fringe fields- associated with the respective drive systems to substantially match, and wherein Fd/Ff is proportional to Nd/Nf.

2. The mechanical rate gyroscope of claim 1 wherein the first drive system and the transverse drive system are electro-static drive systems.

3. The mechanical rate gyroscope of claim 1 wherein the control circuitry is configured to receive at least one sense signal provided by the displacement sensor and having a magnitude proportional to a magnitude of deflection, and to generate an error signal representative of a time average of a difference between the Coriolis force and the feedback force using the sense signal.

4. The mechanical rate gyroscope of claim 3 wherein the error signal comprises a pulse repetition frequency proportional to the applied angular rate.

5. The mechanical rate gyroscope of claim 1 wherein the at least one feedback signal comprises at least one cycle of a drive signal provided to the first drive system for causing the mass to vibrate relative to the base.

6. The mechanical rate gyroscope of claim 1 wherein the segments of the transverse drive system include at least one inactive segment.

7. A mechanical rate gyroscope, comprising:

a mechanical sensor including a base, a mass, a first segmented drive system configured to cause the mass to vibrate relative to the base, a displacement sensor configured to measure deflection of the mass caused by a Coriolis force generated in response to an applied angular rate, and a transverse segmented drive system configured to generate a feedback force to cancel the Coriolis force; and control circuitry configured to receive the measure of deflection and provide at least one feedback signal based on the measure of deflection to the transverse drive system for generating the feedback force, wherein the first drive system includes a plurality of segments operatively coupled to the mass and the transverse drive system includes at least one segment operatively coupled to the mass, wherein the control circuitry is configured to receive at least one sense signal provided by the displacement sensor and having a magnitude proportional to a magnitude of deflection, and to generate an error signal representative of a time average of a difference between the Coriolis force and the feedback force using the sense signal, and wherein the error signal comprises a pulse repetition frequency proportional to the applied angular rate.

8. A mechanical rate gyroscope, comprising:

a mechanical sensor including a base, a mass, a first segmented drive system configured to cause the mass to vibrate relative to the base, a displacement sensor configured to measure deflection of the mass caused by a Coriolis force generated in response to an applied angular rate, and a transverse segmented drive system configured to generate a feedback force to cancel the Coriolis force; and control circuitry configured to receive the measure of deflection and provide at least one feedback signal based on the measure of deflection to the transverse drive system for generating the feedback force, wherein the first drive system includes a plurality of segments operatively coupled to the mass and the transverse drive system includes at least one segment operatively coupled to the mass, wherein the at least one feedback signal comprises at least one cycle of a drive signal provided to the first drive system for causing the mass to vibrate relative to the base.

9. A mechanical sensor, comprising:

a base;

a mass;

a suspension system configured to couple the mass to the base;

a first segmented drive system including a first number Nd of segments operatively coupled to the mass, the first drive system being configured to generate a drive force Fd to cause the mass to vibrate relative to the base;

a displacement sensor configured to measure a deflection of the mass caused by a Coriolis force; and a transverse segmented drive system including a second number Nf of segments operatively coupled to the mass, the segments of the transverse drive system being substantially similar to and transversely oriented relative to the segments of the first drive system, the transverse drive system being configured to generate a feedback force Ff to cancel the deflection of the mass, wherein the segments of the first drive system and the segments of the transverse drive system are arranged to cause fringe fields associated with the respective drive systems to substantially match, and wherein Fd/Ff is proportional to Nd/Nf.

10. The mechanical sensor of claim 9 wherein the first drive system includes a plurality of segments operatively coupled to the mass and the transverse drive system includes at least one segment operatively coupled to the mass.

11. The mechanical sensor of claim 9 wherein the base is a substrate and at least the mass is micro-machined on the substrate.

12. The mechanical rate gyroscope of claim 9 wherein the segments of the transverse drive system include at least one inactive segment.

13. A method of operating a mechanical rate gyroscope including a mechanical sensor and control circuitry, the mechanical sensor having a base, a mass, a first drive system, a displacement sensor, and a transverse drive system, the method comprising the steps of:

generating a drive force Fd to cause the mass to vibrate relative to the base by the first drive system, the first drive system having a first number Nd of segments operatively coupled to the mass;

measuring a deflection of the mass caused by a Coriolis force generated in response to an applied angular rate by the displacement sensor;

generating a feedback force Ff to cancel the Coriolis force by the transverse drive system, the transverse drive system having a second number Nf of segments operatively coupled to the mass, the segments of the transverse drive system being substantially similar to and transversely oriented relative to the segments of the first drive system, the segments of the first drive system and the segments of the transverse drive system being arranged to cause fringe fields associated with the respective drive systems to substantially match, and Fd/Ff being proportional to Nd/Nf; and receiving the measure of deflection and providing at least one feedback signal based on the measure of deflection to the transverse drive system for generating the feedback force Ff by the control circuitry.

* * * * *

UNITED STATES PATENT AND TRADEMARK OFFICE
CERTIFICATE OF CORRECTION

PATENT NO. : 6,470,748 B1
DATED : October 29, 2002
INVENTOR(S) : John A. Geen

It is certified that error appears in the above-identified patent and that said Letters Patent is hereby corrected as shown below:

Column 6,
Line 13, ""$\omega O$"" should read -- "$\omega_o$" --;
Line 22, "$\omega$," should read -- $\varpi$, --;
Line 26, equation (4) reads:
"$\omega = \omega\,(Fd/m) / [k_D/m + j\omega\,(D/m) - \omega^2]$," should read
-- $\varpi = \omega\,(Fd/m) / [k_D/m + j\omega\,(D/m) - \omega^2]$, --;

Column 8,
Line 54, equation (25), reads:
"$\omega S = K_2 \Omega_{IN}, \omega > \omega_o$," should read -- $\omega s = K_2 \Omega_{IN}$, $\omega > \omega_o$, --; and Column 9,
Line 32, "cross-switch switch" should read -- cross-switch --.

Signed and Sealed this

Seventh Day of October, 2003

JAMES E. ROGAN
*Director of the United States Patent and Trademark Office*